United States Patent

Mayer et al.

[15] 3,701,414

[45] Oct. 31, 1972

[54] FAILSAFE DECELERATING SYSTEM

[72] Inventors: Gerald C. Mayer, Wayne, N.J.; Gregory A. Vaka, Hacienda Heights, Calif.; Raymond S. Zuckermann, Teaneck, N.J.; Alonzo B. Jarman, Wrightstown, Pa.

[73] Assignee: Litton Industrial Systems, Inc., Passaic, N.J.

[22] Filed: April 6, 1971

[21] Appl. No.: 131,720

[52] U.S. Cl. ................................198/203, 198/110
[51] Int. Cl. ........................................B65g 23/00
[58] Field of Search .198/110, 203; 303/21 B, 21 CF, 303/21 BB; 324/161; 318/304, 372

[56] References Cited

UNITED STATES PATENTS 3,084,307  4/1963  Landis ..................324/161 X
1,350,214  8/1920  Eisenmann ............318/304 X Primary Examiner—Richard E. Aegerter
Assistant Examiner—Douglas D. Watts
Attorney—John D. Boos and John D. Lister

[57] ABSTRACT

The comparison of fluid flows or electrical signals is utilized to decelerate a system (e.g., a conveyor) by regulating the fluid pressure in a brake assembly. A time decay reference signal which is related to the speed of a control motor, conveyor or other reference source is compared with a similar signal related to the speed of a controlled conveyor. The comparison of these two signals is employed to control the application of the brake in the controlled conveyor system so that the controlled conveyor will decelerate in a predetermined manner. Once the controlled conveyor is stopped, any rearward or forward movement of the controlled conveyor generates a signal which actuates the brake to again decelerate the controlled conveyor. The drive assembly of the controlled conveyor has a flywheel to insure that the minimum stopping time of the controlled conveyor from its normal operating speed exceeds a predetermined time.

16 Claims, 5 Drawing Figures

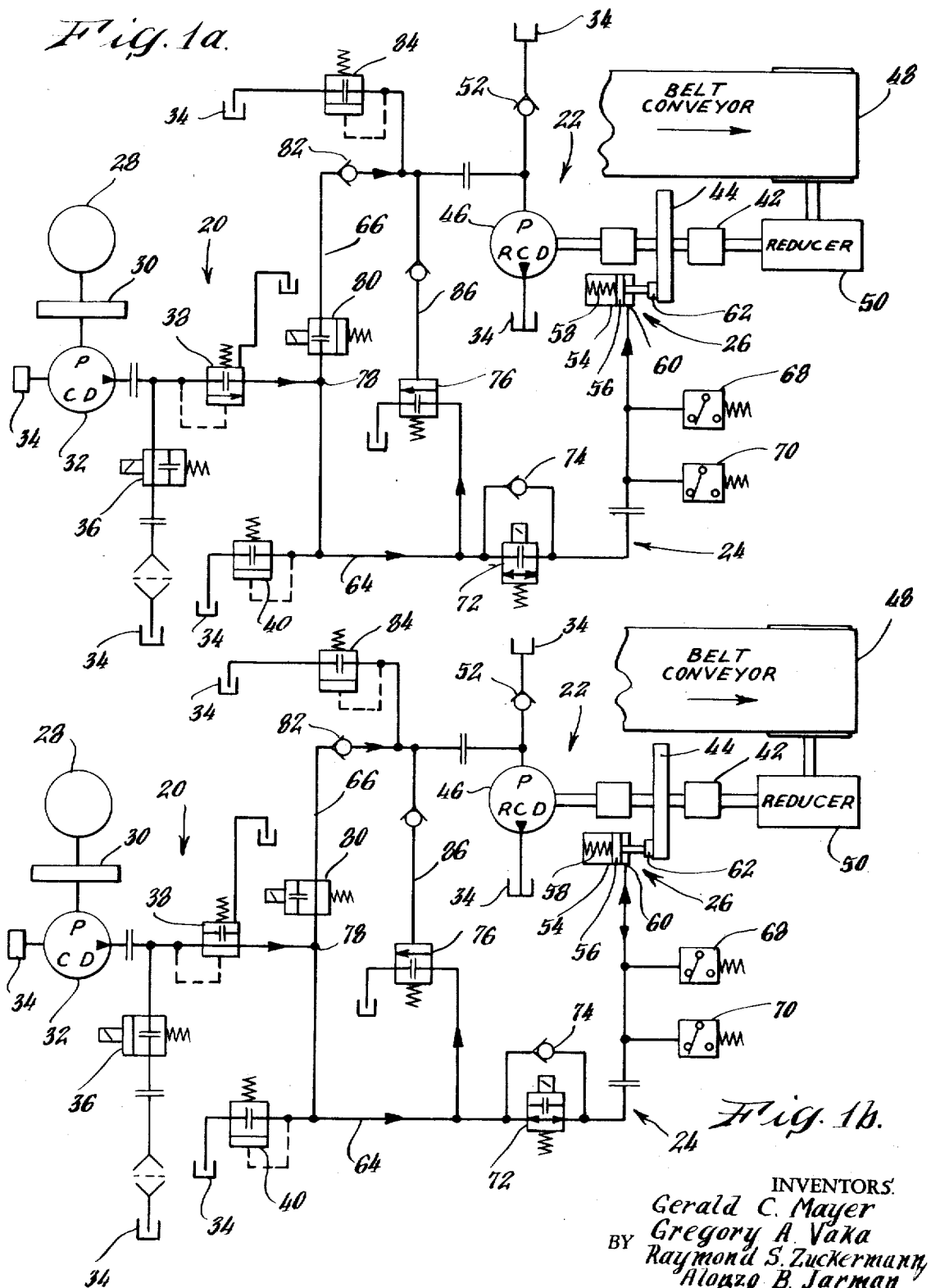

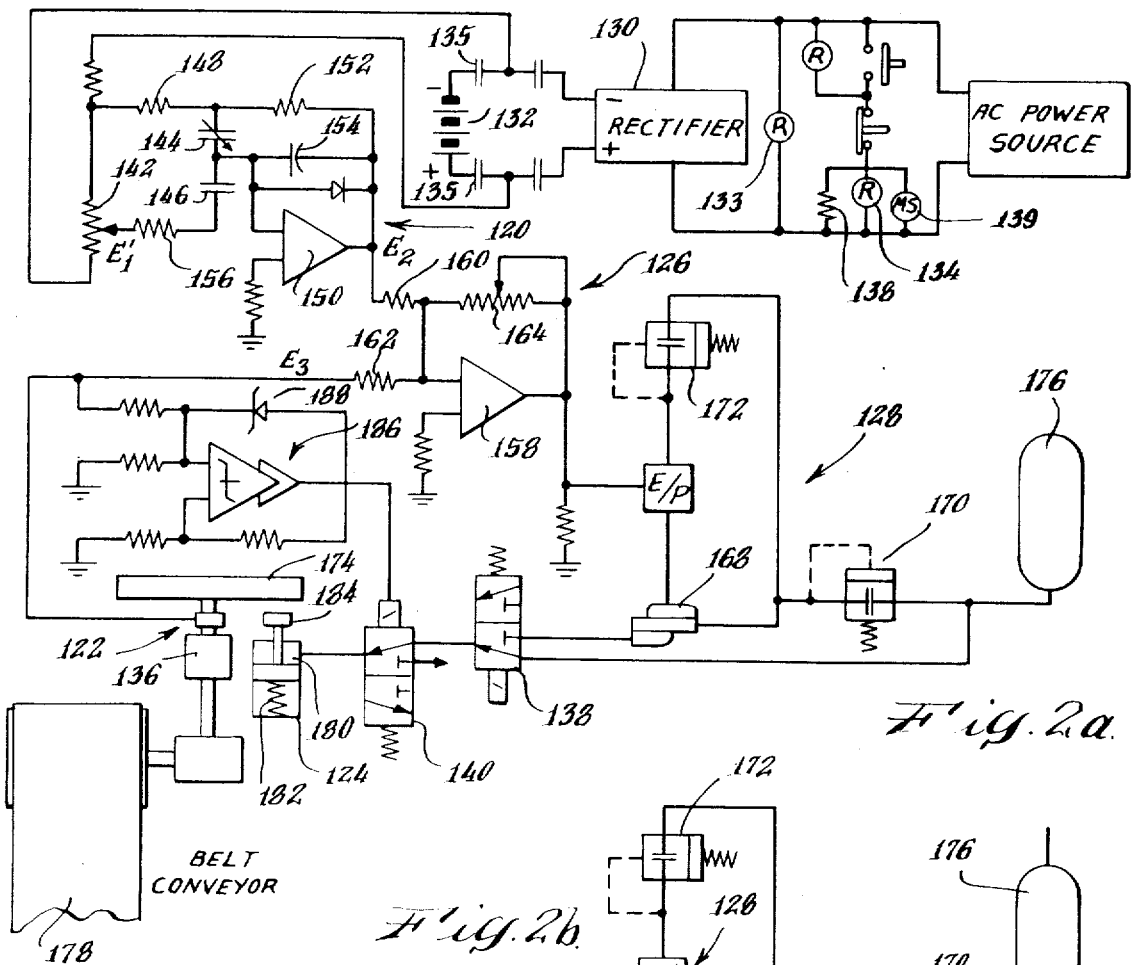
Fig. 2a.
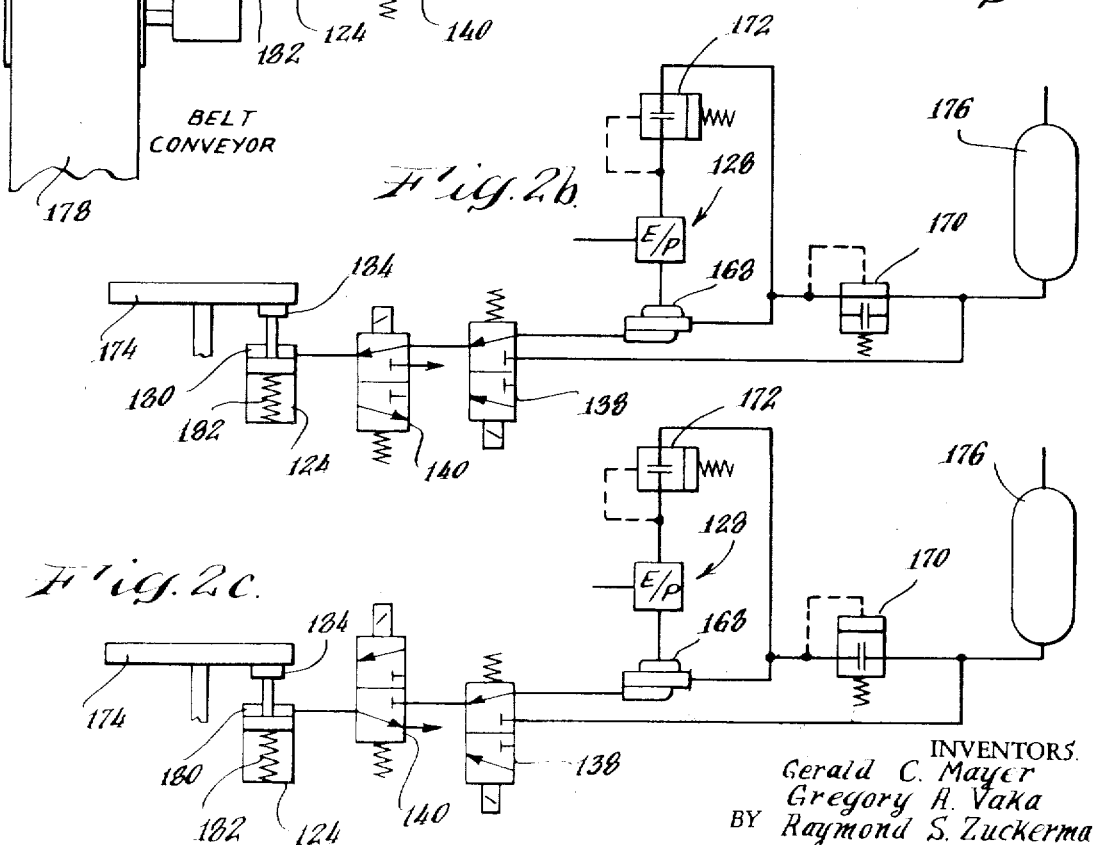
Fig. 2b.
Fig. 2c.
INVENTORS.
Gerald C. Mayer
Gregory A. Vaka
Raymond S. Zuckermann
Alonzo B. Jarman
BY
John D Lister
ATTORNEY

FAILSAFE DECELERATING SYSTEM

BACKGROUND OF THE INVENTION

This invention relates to a decelerating system and more specifically to a unique fail-safe decelerating system which stops a conveyor in a predetermined manner (e.g., in a fixed time interval with uniform deceleration) and maintains the conveyor substantially at rest once it has been halted.

One objective of this invention is to provide a fail-safe control system which stops a conveyor within a predetermined period of time or in a predetermined manner in the event of normal shutdown, a power failure, emergency shutdown or the like. The time lapse involved and/or the predetermined manner of stopping the conveyor is governed by a flywheel in the conveyor drive train which insures a minimum conveyor drift time and by means of a clocking mechanism which governs the maximum conveyor drift time.

The present decelerating system is of particular importance in conveyor systems wherein a series of conveyors are employed. In such a system the stopping times of the conveyors should be strictly controlled so that the time for bringing a conveyor to a halt will normally at least equal the stopping time of the preceding conveyor. Without such controls an upstream conveyor might continue to operate after the following conveyor has stopped causing an overflow of material at the loading end of the downstream conveyor.

A further object of the present invention is to provide a system which will maintain a conveyor at rest or substantially at rest once it has been stopped. For example when a conveyor is carrying a load up an incline, once the conveyor has been stopped, the load on the conveyor may start to drive the conveyor backward resulting in a build-up or overflow of material at the loading end of the conveyor. However, even with a power failure, the fail-safe decelerating system of the present invention functions to prevent or minimize this backward movement thereby eliminating this problem.

A still further object of a preferred embodiment of the invention is to effect the setting and release of brake assemblies in the system by regulating the fluid pressure in the brake assemblies wherein the pressure at the brake assemblies is controlled by comparing fluid flows.

BRIEF DESCRIPTION OF THE INVENTION

The fail-safe decelerating system of the present invention includes a clock assembly which issues a reference signal; a signal assembly associated with the controlled conveyor or system that produces a signal proportional to the speed of the conveyor or system being controlled; a comparator assembly for comparing the reference signal with the signal of the controlled system and issuing a command signal; and a brake assembly which functions to decelerate the controlled system in accordance with the command signal. In addition to the above a rollback assembly is provided to prevent or minimize any tendency of the controlled system to reverse its direction of movement once the controlled system has been brought to a halt.

The preferred systems, as illustrated, are hydraulic or electropneumatic with the term hydraulic being used in a broad sense to include fluids in general. Since a primary object of the present invention is to provide a fail-safe decelerating system for conveyors, the invention will be described as utilized in a conveyor braking assembly.

In the preferred hydraulic system the clock includes a motor; a flywheel; and a first pump which are all coupled together. The signal assembly of the controlled conveyor includes the drive motor of the controlled conveyor; a flywheel; and a second pump, having the same capacity as the first pump for a given RPM.

In the brake assembly, the brake shoe which is applied to the flywheel of the controlled conveyor is spring biased toward braking engagement with the flywheel but is normally held out to engagement by fluid pressure within the brake cylinder that opposes the action of the spring. With the above construction it can be seen that the regulation of pressure in the brake cylinder will govern the application of the brakes and effect a controlled deceleration of the conveyor.

During a shutdown, loss of power or the like, the comparator assembly interconnects the pumps with each other and the brake cylinder in such a manner that the output of the pump in the clock system pressurizes the brake cylinder and also provides a supply of fluid to the pump of the controlled conveyor. Consequently, if the output of the clock pump equals the requirements of the conveyor pump, the pressure within the brake cylinder will remain unchanged. However, should the requirements of the conveyor pump exceed the output of the clock pump, there will be a pressure drop in the brake cylinder allowing the brake shoe to engage the flywheel of the conveyor and retard the speed of the conveyor. If the output of the clock pump exceeds the requirements of the conveyor pump there will be an increase in the pressure within the brake cylinder thereby reducing the pressure of the brake shoe against the flywheel of the conveyor or completely disengaging the brake shoe and the flywheel. In this manner the braking of the conveyor is controlled by the clock assembly so as to bring the conveyor to a stop in a predetermined manner.

The system also functions to prevent or minimize conveyor rollback in that should the pump of the controlled conveyor be driven in reverse a pressure actuated pressure relief valve is activated to vent fluid from the brake cylinder thereby reducing the pressure in the brake cylinder. The reduction of the fluid pressure in the brake cylinder allows the spring actuated brake to engage the flywheel of the controlled conveyor and maintain the conveyor substantially at rest.

The electrical equivalent of the above described conveyor brake system also includes a clock assembly, an indicating signal assembly, a comparator assembly and brake assembly. The clock is a ramp generator whereby in the event of a power failure a time decay reference signal is produced. In the comparator assembly, this signal is compared with the output signal of a tachometer operatively coupled with the conveyor being controlled and the difference therebetween is transmitted to an electro-pneumatic or electro-hydraulic convertor. The convertor changes the electric signal to a pneumatic or hydraulic signal which activates a pneumatic or hydraulic control circuit.

The signal from the convertor, through a volume booster regulates the pressure within the braking assembly of the controlled conveyor to bring the controlled conveyor to a stop in accordance with the output signal generated by comparing the signals of the clock and the conveyor tachometer. The pneumatic or hydraulic output of the volume booster either increases or decreases the pressure within the brake cylinder depending on the amplitude of the output signal of the comparator assembly so that the speed of the conveyor is regulated in a predetermined manner relative to the time decay reference signal of the clock assembly. In the event of a general power failure, power continues to be supplied to the system by means of a conventional battery generator.

The rollback circuit of the system comprises a conventional error amplifier which receives an output signal from the conveyor tachometer. When the tachometer is driven in the reverse direction, the signal from the tachometer de-actuates a solenoid valve which interconnects the brake cylinder with a reservoir to allow the fluid within the brake chamber to be expelled into the reservoir. Thus, when the conveyor moves in reverse, the brake cylinder is vented and the brakes are set thereby maintaining the conveyor at rest or substantially at rest.

The above objects and advantages of the present invention will become more apparent and other objects and advantages of the present invention will become apparent from the following detailed description of the preferred embodiment taken in conjunction with the accompanying drawings in which:

FIG. 1a is a schematic representation of the hydraulic decelerating system for a belt conveyor under normal operating conditions;

FIG. 1b is a schematic representation of the hydraulic decelerating system for a belt conveyor when the conveyor is being slowed;

FIG. 2a is a schematic representation of the electro-pneumatic equivalent of the hydraulic decelerating system for a belt conveyor under normal operating conditions;

FIG. 2b is a schematic representation of the control valves and brake assembly of the electro-pneumatic equivalent of the hydraulic decelerating system for a belt conveyor when the conveyor is being slowed; and FIG. 2c is a schematic representation of the control valves and brake assembly of the electro-pneumatic equivalent of the hydraulic decelerating system for a belt conveyor when the system is operating to prevent conveyor rollback.

DETAILED DESCRIPTION OF THE INVENTION

Referring now to the drawings and specifically to FIG. 1a of the drawings which illustrates the hydraulic embodiment of the invention, under normal operating conditions, the decelerating system comprises a clock assembly 20; an indicating signal assembly 22; a comparator assembly 24; and brake assembly 26. While a hydraulic system is utilized for the purpose of description, it is to be understood that the system can also be pneumatic or utilize other types of fluids.

The clock 20 has a motor 28, which, under normal operating conditions, drives a flywheel 30 and a constant displacement pump 32 at a constant predetermined RPM. While the motor 28 normally acts solely as a means for driving pump 32 and flywheel 30 of the clock at a selected speed to thereby provide a reference signal for the brake system, it can also serve as the drive motor for a conveyor belt. The pump draws hydraulic fluid from a reservoir 34 and discharges the fluid into hydraulic lines leading to solenoid valve 36 and control valve 38.

The solenoid valve 36 directs the flow from pump 32 to the reservoir 34 under normal operating conditions and directs the flow to a control valve 38 when it is de-energized. The control valve 38 maintains the pressure on the output side of pump 32 at a predetermined value $P_1$ thereby requiring a constant torque to drive pump 32. The constant backtorque created by valve 38 functions to insure a uniform and consistent decelerating time whenever motor 28 and solenoid valve 36 are de-energized. A relief valve 40 provides a means for relieving the pressure on the output side of the pump, should the pressure in the lines to the brakes exceed a given value and also maintains the brake line pressure below the setting of control valve 38 to prevent interaction. Solenoid valve 36 is mainly provided to permit the fluid passing through the pump under normal operating conditions to be discharged back into the reservoir 34 rather than forcing it through the pressure control valve 38 and the pressure relief valve 40. Under normal operating conditions this reduces the heat generated in the clocking system as a result of the fluid passing through the pump and increases the operating efficiency of the system.

The indicating signal assembly 22 of the system has a motor 42 which drives a flywheel 44 and pump 46 as well as belt conveyor 48 through reducer 50. The flywheel 44 is selected to have a weight sufficient to provide the energy necessary to assure that the drift of the conveyor 48 will continue for a certain minimum time even under the worst loading conditions contemplated. The pump 46 is a constant deplacement pump having a capacity equal to that of pump 32 at any given RPM or speed. Under normal operating conditions the pump 46 draws fluid from reservoir 34 through a check valve 52 and discharges the fluid back into the reservoir. The check valve prevents cavitation by allowing fluid flow from the reservoir to pump 46 when the pump is isolated from pump 32 or when it is rotating faster than pump 32 when they are interconnected.

The brake assembly 26 is made up of a brake cylinder 54 having a piston 56 therein which is spring biased toward the flywheel 44 by a spring 58 acting on one face of the piston head. The cylinder is also provided with an inlet - outlet port 60 on the other side of the piston head to permit the flow of pressurized hydraulic fluid into and out of the cylinder. With this construction a drop in the fluid pressure within the cylinder below a certain level allows the spring to extend the brake disc or shoe 62 on the end of the piston rod into engagement with the flywheel 44 to thereby effect a braking action on the flywheel and the deceleration of the system. Of course, the amount of force applied against the face of the flywheel 44 by the brake disc 62 is governed by the difference in the forces exerted on the piston by the spring 58 and the opposing fluid pressure within the brake assembly.

The comparator assembly 24 includes a pair of hydraulic lines 64, 66 leading from the clock 20 to the inlet side of the pump 46 and the fluid chamber of the brake cylinder 54. The hydraulic line 64 leading from the clock to the brake is provided with pressure switches 68 and 70 which allow the conveyor to be started and monitor the pressure within the brake cylinder to maintain the pressure within the brake cylinder within certain limits during normal operation of the conveyor system. Pressure switch 70 is actuated when the pressure within the brake cylinder drops below a specific value to effect the de-energization and closing of solenoid valve 36 so that the output of the pump can move through valve 38 to increase the pressure in the brake cylinder 54. As soon as the pressure in the brake cylinder attains a certain level, pressure switch 70 is actuated to effect the opening of the solenoid valve 36 so that the pressure within the brake cylinder is maintained within the specified limits desired.

Line 64 can have a solenoid valve 72 therein together with a check valve 74 located in a line which bypasses solenoid valve 72. These valves normally act to seal off the brakes from the rest of the system so that leakage in other parts of the system does not affect the brakes. The solenoid valve 72 is energized when power is applied to motor 28 whereby fluid flow from the pump 32 is directed through check valve 74 to the brakes. When power is cut off from motor 28, the solenoid valve 72 is de-energized to permit the flow of fluid from the brakes to dump valve 76 or the juncture of lines 64, 66.

The hydraulic line 66 that leads from the clock to the inlet side of pump 46 is provided with a solenoid valve 80, check valve 82 and a pressure relief valve 84. The solenoid valve 80 is energized when power is applied to motor 28 so as to prevent the flow of fluid from the clock to pump 46 under normal operating conditions and de-energized when power is cut off from motor 28 during a shutdown to interconnect the pumps for the comparison of fluid flows (the output of pump 32 and the input of pump 46). The check valve 82 insures a unidirectional flow from the clock to the pump 46 when the solenoid valve 80 has been de-energized to permit the flow of fluid through line 66 and the pressure relief valve 84 is included in line 66 to insure that the operating pressures in the line do not increase above predetermined limits.

The decelerating system is also provided with a rollback circuit which maintains the conveyor belt at rest or substantially at rest once the belt has been stopped. This circuit includes a fluid line 86 leading from what is normally the inlet side of the pump 46 to the dump valve 76 which is interconnected with the brake cylinder 54 for venting the brake cylinder during rollback. The pump 46, which is reversible, draws fluid from reservoir 34 through its normal outlet line and discharges the fluid into the inlet line when the conveyor belt 48 moves in reverse. Due to check valves 52 and 82, the fluid is pumped through line 86 to the pressure dump valve 76. This actuates the dump valve to reduce the pressure within the brake cylinder 54 until the force of the brake shoe against the flywheel 44 brings the conveyor to a stop and maintains the conveyor in that state.

The decelerating system is activated by starting motor 28 which through direct coupling brings the clock flywheel 30 and pump 32 up to operating speed. At the same time, solenoid valve 36 is de-energized and closed thereby preventing the output of pump 32 from being returned to the reservoir 34. In addition, valves 72 and 80 are energized, thereby shifting these valves to their closed positions.

As a result of the above, the output from pump 32 provides the pilot pressure to open control valve 38 at pressure $P_1$. Consequently, the output from the pump now is directed through valve 38, to relief valve 40, dump valve 76, check valve 74, pressure switches 68, 70, and brake cylinder 54. The pressure in the line interconnecting these components increases closing pressure switch 68 at $P_2$, the minimum pressure required to keep the brakes released. The closing of pressure switch 68 permits the conveyor motor 42 to start thereby placing the belt conveyor 48 and pump 46 in operation. The pump 46 draws fluid from the reservoir 34 through check valve 52 and discharges fluid back into the reservoir.

At a pressure $P_3$ (above $P_2$ but below $P_1$) pressure switch 70 closes, energizing solenoid valve 36 and permitting the output from pump 32 to pass back into the reservoir. The pressure in the brake cylinder is maintained by the action of check valve 74 and the closed position of solenoid valve 72. The system is now in its normal operating mode.

The brakes will remain released provided the pressure in the line between cylinder 54 and check valve 74 remains reasonably constant. Should the pressure in this line drop below $P_4$ (a pressure below $P_3$ but above $P_2$) for some reason (e.g., leakage through check valve 74, solenoid valve 72, or in the lines), pressure switch 70 will open deenergizing and closing solenoid valve 36. This causes the output of pump 32 to open pressure control valve 38 and direct the output through check valve 74 to the brakes, thereby building up the pressure within the cylinder and line to $P_3$. This closes switch 70 and again energizes solenoid valve 36 to direct the output from the pump 32 back into the reservoir.

When the power to conveyor motor 42 is cut off or in the event of a power failure or the like, motor 28, and solenoid valves 36, 72, 80 are simultaneously de-energized as shown in FIG. 1b. This interconnects pump 32 with pump 46 and brake cylinder 54.

The flywheels 30 and 44 continue to rotate, due to their inertia, driving pumps 32 and 46. Pump 32 is subjected to a constant back pressure resulting from the pressure setting of control valve 38. This constant back pressure is transmitted through the pump 32 to the flywheel 30 whereby it acts as a retarding torque to dissipate the inertia of flywheel 30 and effect a uniform deceleration of the flywheel. This, in turn, causes a uniform decrease in the RPM or speed of pump 32 and a uniform decrease in the output flow rate of the pump 32.

At junction 78 the uniformly decreasing flow from pump 32 is compared to the flow into pump 46. Providing both pumps are running at the same RPM, the rates of fluid flow into and out of junction 84 will be equal and the pressure will remain constant.

Since the pressure at junction 78 is equal to the pressure in the brakeline 64, there will be no change in the fluid pressure within brake cylinder 54 and the brakes will be maintained in the position they occupied at the time the flow rates of pumps 32 and 46 equalized. If the brakes have not become set prior to the time flywheel 30 and conveyor 48 have stopped, the pressure in the system will gradually drop due to leakage, etc., allowing the brakes to set. Of course, in the event that conveyor 48 should start to move in its normal direction of travel, pump 46 will be driven to withdraw fluid from junction 78. Since pump 32 is at rest, fluid is withdrawn from brake line 64, thereby lowering the pressure in brake cylinder 54 and causing the brakes to set.

If the conveyor 48 decelerates slower than the clock flywheel 30, the RPM and fluid intake of pump 46 will be higher than the RPM and fluid output of pump 32. Thus, if the conveyor speed is higher than it should be at any given moment during a shutdown of the system, more fluid will be removed from junction 78 than is supplied by pump 32 and a pressure drop will occur in the brakeline. If the conveyor continues to run faster than it should, the pressure drop in the brakeline will reach a point where the brakes will apply enough torque to slow the conveyor 48 and pump 46 down until the pump 46 is running at the same speed as pump 32. The decelerating system is once again in balance with the flow rate into and out of junction 78 equalized.

If, during the deceleration of the conveyor 48, the conveyor speed at any given moment is lower than it should be, the RPM and intake of pump 46 will be lower than the RPM and output of pump 32. This will result in a greater supply of fluid to junction 78 than removal by pump 46 and an increase in the brakeline pressure. If the conveyor continues to run slow, the pressure in the brakeline will increase to the point where the decelerating action of the brakes is reduced until the speeds of the pumps 32, 46 are equalized and the system is again balanced.

The above-described cycling of pressure at junction 78 continues until the conveyor is stopped. The clock flywheel 30 is selected so that the inertia of the flywheel will drive pump 32 for a preselected time against the backtorque caused by control valve 38. The conveyor flywheel 44 is selected so that under the worst anticipated loading conditions, the inertia of the flywheel will cause the conveyor to drift for a desired minimum amount of time. Consequently, the brakes 26 function to decelerate the conveyor and prevent excessive drift time.

If the conveyor 48, due to a severe overload, stops while the clock flywheel 30 and pump 32 are still rotating, there may be enough pressure in the brakeline 64 to keep the brake 26 released. If, during this time or at any time, the load on the conveyor 48 is such that the conveyor starts to move in reverse (roll back), pump 46 will reverse rotation and pump fluid from the reservoir 34 into the system. The check valves 52 and 82 limit the fluid flow from the pump and allow the pressure within line 86 to increase and actuate dump valve 76. When dump valve 76 is opened by the pressure within line 86, the fluid in line 64 between pressure control valve 38 and brake cylinder 54 is vented thereby automatically setting the brakes and stopping any further roll back.

Pressure relief valve 84 is set at a pressure above that required to actuate dump valve 76 and prevents the pressure in the system from exceeding preselected limits. It should be noted that the reducer 50 causes a large rotation of pump 46 for a small reverse movement of the conveyor 48 thereby effecting a rapid actuation of the dump valve. Consequently, only a slight movement in the reverse direction is required to set the brakes.

FIGS. 2a, 2b and 2c illustrate a decelerating system which compares electrical signals rather than fluid flows. The system of FIGS. 2a, 2b, 2c includes a clock 120; a conveyor speed indicating assembly 122; a brake assembly 124 associated with a conveyor; a comparator 126; and a convertor and amplifying assembly 128. Power for the system is normally supplied by a conventional A-C power source with a rectifier 130 being provided to convert the alternating current to direct current. In addition a battery 132 is provided in the system to insure a source of power to operate the decelerating system in event of a general power failure. When a general power failure occurs, it is detected by relay 133 which closes contacts 135 to place the battery 132 in the circuit.

A conventional control circuit, as shown in a simplified form in FIG. 2a is provided to control the shutdown sequence. The control circuit includes a control relay, 134 (for contacts 144, 146) which along with the solenoid valve 138, is connected in parallel across the conveyor drive motor starter 139. With the conveyor operating in the normal manner both the control relay (134) and the solenoid valve (138) are energized. With control relay 134 energized clock contacts 144 are closed and 146 are open.

The clock 120 is an integrating circuit with provisions (resistances 148, 152 and input voltage $E_{1ss}$) for selecting and establishing an initial condition corresponding to normal operating conditions. During normal operating conditions contacts 144 are closed and contacts 146 are open. A positive steady state voltage $E_{1ss}$ is applied to the input resistor 148 of an operational amplifier 150. The resistor 148 has a resistance $R_1$ and amplifier 150 has a very high gain, a low input current, and is inverting. The feedback network consists of resistor 152, having a resistance $R_2$, and a capacitor 154, having a capacitance $C_1$, in parallel. Under steady state conditions the clock output voltage $E_{2ss}$ is essentially equal to $(-R_2R_1)(E_{1ss})$ and is a negative voltage. The magnitude of this voltage $E_{2ss}$ is selected to equal the positive voltage $E_{3ss}$ produced by the controlled conveyor tachometer generator 122 when the conveyor is operating in the normal direction.

In the event of a conveyor shutdown due to either a normal operator initiation or a power failure the relay for contacts 144, 146 is de-energized, contacts 144 open, contacts 146 close and the clock becomes an integrator. A negative voltage $E_1'$, is connected to an input resistor 156, of operational amplifier 150 which has a resistance $R_3$. Capacitor 154 is in the feedback loop, and has a voltage equivalent to the previously selected initial condition value $E_{2ss}$ applied across it. The clock output voltage $E_2$ will now vary in accordance with the following equation:

$$E_2 = -E_{2ss} + (E_1'/R_3 C_1) t$$

where $t$ = time in seconds after the stop was initiated. The slope of the ramp can be selected by varying $E_1'$ as desired through the potentiometer 142.

As shown by the above equation the clock output, under shutdown conditions, will begin with a valve of $-E_{2ss}$ and reduce its valve towards zero in a linear fashion at an easily pre-determined rate.

The speed of the controlled conveyor is measured by tachometer 122 which produces an electrical voltage $E_3$ which is proportional to the speed of the controlled conveyor. This is connected to the comparator 126 and is a positive voltage.

The comparator 126 consists of an operational amplifier 158 connected as a summation circuit. It has two inputs $E_2$, the negative voltage coming from the clock connected to input resistor 160, and $E_3$, the positive voltage proportional to the controlled conveyor speed connected to input resistor 162. Input resistors 160, 162 have resistances $R_4$, $R_5$ respectively which are of equal values. The feed back resistor 164 has a resistance $R_6$ which is variable to provide an adjustable gain. The comparator output voltage $E_4$ is then $$E_4 = \left[ \frac{-E_2}{R_4} - \frac{E_3}{R_5} \right] R_6$$

$$E_4 = \frac{R_6}{R_4} \left[ E_{2ss} - \frac{E_1'}{R_3 C_1} t - E_3 \right]$$

Under controlling conditions $E_4$ will be positive when the controlled conveyor speed is lower than the equivalent speed called for by the clock and the magnitude will be proportional to their difference. Likewise $E_4$ will be negative when the controlled conveyor speed is higher than the equivalent speed called for by the clock and the magnitude will be proportional to their difference.

The electric to pneumatic convertor 128 converts the voltage $E_4$ to a proportional pneumatic signal which in turn is amplified by the pneumatic booster 168 to provide sufficient volume to actuate the brake. The convertor 128 and booster 168 are conventional commercially available units. For example the convertor 128 can be a Honeywell Model No. 31200 I/P transducer. Pressure control valves 170 and 172 are provided to maintain the pressures at the convertor and pneumatic booster within predetermined limits.

During a shutdown, when the conveyor speed is greater than that programmed, the value of the output voltage $E_4$ of the comparator becomes negative, and through the convertor 128, this causes the pressure output of the pneumatic booster 168 to decrease. As shown in FIG. 2a, this in turn decreases the pressure to the brake cylinder and increases the brake pressure on the flywheel causing the conveyor to decelerate at a faster rate. As the clock signal approaches the conveyor speed the negative output voltage $E_4$ decreases and through convertor 128 the control pressure to the brake will increase and the braking action on the conveyor will decrease. As in the embodiment of FIG. 1a and 1b, the flywheel 174 is selected to assure a minimum drift time for the worst conveyor loading conditions anticipated.

Under normal operating conditions (FIG. 2a) the conveyor master relay 134 is energized, thereby closing the contacts 144 which places the clock on the inverting but non-integrating circuit. With the clock operating under this condition due to the previous calibration of the system there is no error signal generated at the input of comparator circuit 126. Solenoid valves 138, 140 are energized so that air is supplied to the brake 124 directly from the compressed air reservoir 176. In this condition the air pressure within the brake 124 is sufficient to maintain the brake in released position so as not to interfere with the operation of the conveyor 178.

When it is desired to stop the conveyor, or when there is a loss in power, the contacts 144 are opened and the contacts 146, for the integrating circuit of the clock are closed. The time decay reference signal of the clock 120 is commenced. As the reference voltage $E_2$ from the clock decreases, any difference between the amplitude of this signal and the amplitude of the signal from the conveyor tachometer is summed up and amplified by the comparator and converted to a pneumatic signal by convertor 128 to control the application of the brake on the flywheel of the conveyor. At the same time solenoid valve 138 is deenergized (see FIG. 2b) whereby the volume booster 168 which was originally bypassed during normal operating conditions, is placed in the pneumatic line leading from the pressurized fluid reservoir to the brake cylinder. Consequently, the pressure of the fluid within the brake cylinder 180 that is acting against the spring 182 is regulated by the output of the volume booster and the application of the brake shoe 184 against the flywheel 174 is controlled to bring conveyor 178 to a halt in the desired manner.

In order to achieve the positive roll-back function the decelerating system is provided with a conventional error amplifier 186 having a diodezener 188 therein which normally maintains solenoid valve 140 in an energized state as long as the conveyor belt is moving forward or stopped. Any reversal in the movement of the conveyor 178 causes the conveyor tachometer 122 to produce a voltage of the opposite polarity which allows the solenoid valve 140 to de-energize. The de-energization of the solenoid valve 140 as shown in FIG. 2c allows the fluid within the brake cylinder to be vented to the atmosphere or dumped into the reservoir thereby setting the brake.

While preferred forms of the invention have been shown and described, it is to be understood that modifications and equivalents can be resorted to without departing from the spirit and scope of the present invention as defined in the claims.

What is claimed is:

1. A decelerating system for a conveyor comprising:
   drive assembly means for driving a conveyor, said drive assembly means having a motor coupled to a drive train of said conveyor, said drive assembly means having a flywheel coupled to said drive train to keep said conveyor moving through the inertia of said flywheel for a limited period of time after said motor ceases to drive said drive train;
   signal generating means connected to said drive assembly means, said signal generating means generating a first signal proportional to the speed of said conveyor;
   reference signal generating means for generating a second signal to be compared with said first signal when power to said motor is cut off; said second signal declining in amplitude as a function of time;
   brake means for retarding movement of said drive assembly; and
   comparing means for comparing said first and second signals and regulating said brake means in accordance with said comparison so as to retard the movement of said drive assembly in a predetermined manner.

2. In the decelerating system of claim 1:
said brake means being pressure actuated and said comparing means regulating pressure in said brake means.

3. In the decelerating system of claim 2:
said signal generating means being a first pump, and said reference signal generating means being a second pump having a capacity equal to said first pump for a given speed.

4. In the decelerating system of claim 3:
holdback means for effecting actuation of said brake means when said conveyor moves backward.

5. In the decelerating system of claim 4:
said holdback means having a dump valve connected to said brake means, said dump valve being actuated by pressure and connected to said first pump, and said first pump being reversible whereby backward movement of said conveyor effects actuation of said dump valve and a reduction of pressure in said brake means.

6. In the decelerating system of claim 3:
an outlet port of said second pump and an inlet port of said first pump being interconnected by a first hydraulic line, said outlet port of said second pump and said brake means being interconnected by a second hydraulic line, valve means for isolating said inlet port of said first pump from said outlet port of said second pump and said brake means when power is supplied to said motor and said conveyor is in operation, said valve means interconnecting said inlet port of said first pump with said outlet port of said second pump and said brake means when power to said motor is cut off whereby a differential in the flow rates of said first and second pumps will affect the regulating pressure in said brake means.

7. In the decelerating system of claim 6:
holdback means for effecting actuation of said brake means, when said conveyor moves backward.

8. In the decelerating system of claim 7:
said holdback means having a dump valve connected to said brake means, said dump valve being actuated by pressure and connected to said first pump, and said first pump being reversible whereby backward movement of said conveyor effects actuation of said dump valve.

9. In the decelerating system of claim 2:
said first signal being a voltage generated by a tachometer generator coupled to said conveyor drive train and driven by said conveyor, said second signal being a voltage generated by a ramp generator, said comparing means comparing said voltages and issuing a control signal for regulating the pressure in said brake means.

10. In the decelerating system of claim 9:
holdback means for effecting actuation of said brake means when said conveyor moves backward.

11. A decelerating system for a conveyor comprising:
drive assembly means for driving a conveyor, said drive assembly means having a first motor coupled to a drive train of said conveyor, said drive assembly means having a flywheel coupled to said drive train to keep said conveyor moving through the inertia of said flywheel for a limited period of time after said first motor ceases to drive said drive train:

signal generating means associated with said drive assembly means, said signal generating means being a first pump coupled to said drive train whereby said first pump is driven at a rate of speed proportional to the speed of said conveyor and has a flow rate proportional to the speed of said conveyor;

reference signal generating means, said reference signal generating means being a second pump having a capacity equivalent to said first pump for a given speed, said second pump being coupled to a second flywheel and a second motor, said second pump being driven by said second motor during the normal operation of said system to maintain a source of pressure within said system, said second pump being driven by said second flywheel for a limited period after said second motor ceases to drive said second flywheel and said second pump to provide a reference signal, said second pump having a flow rate proportional to the speed of said second flywheel which declines in amplitude as said second flywheel decelerates;

comparing means for comparing said flow rates and regulating the pressure within the decelerating system in accordance with said flow rates; and brake means for retarding the movement of said conveyor, said brake means being regulated by the pressure in said system whereby the retarding of the movement of said conveyor by said brake means is governed by the relative flow rates of said first and second pumps.

12. In the decelerating system of claim 11:
holdback means for effecting actuation of said brake means when said conveyor moves backward.

13. In the decelerating system of claim 12:
said holdback means having a dump valve connected to said brake means, said dump valve being actuated by pressure and connected to said first pump, and said first pump being reversible whereby backward movement of said conveyor effects actuation of said dump valve and a reduction of pressure in said brake means.

14. In the decelerating system of claim 11:
an outlet port of said second pump and an inlet port of said first pump being interconnected by a first hydraulic line, said outlet port of said second pump and said brake means being interconnected by a second hydraulic line, valve means for isolating said inlet port of said first pump from said outlet port of said second pump and said brake means when power is supplied to said first motor and said conveyor is in operation, said valve means interconnecting said inlet port of said first pump with said outlet port of said second pump and with said brake means when power to said first motor is cut off whereby a differential in the flow rates of said first and second pumps will affect the regulating pressure in said brake means.

15. In the decelerating system of claim 14:
holdback means for effecting actuation of said brake means when said conveyor moves backward.

16. In the decelerating system of claim 15:

said holdback means having a dump valve connected to said brake means, said dump valve being actuated by pressure and connected to said first pump, and said first pump being reversible whereby backward movement of said conveyor effects actuation of said dump valve.

* * * * *